United States Patent [19]
Ji et al.

[11] Patent Number: 5,861,979
[45] Date of Patent: Jan. 19, 1999

[54] ARRAY OF THIN FILM ACTUATED MIRRORS HAVING AN IMPROVED OPTICAL EFFICIENCY AND AN INCREASED PERFORMANCE

[75] Inventors: Jeong-Beom Ji; Yong-Ki Min, both of Seoul, Rep. of Korea

[73] Assignee: Daewoo Electronics Co., Ltd., Seoul, Rep. of Korea

[21] Appl. No.: 771,079

[22] Filed: Dec. 20, 1996

Related U.S. Application Data

[63] Continuation-in-part of Ser. No. 363,469, Dec. 23, 1994, Pat. No. 5,604,623.

[30] Foreign Application Priority Data

Jan. 18, 1994 [KR] Rep. of Korea ........................... 94-801

[51] Int. Cl.$^6$ .................................................. G02B 26/00
[52] U.S. Cl. ........................................... 359/291; 359/850
[58] Field of Search .................................... 359/290, 291, 359/292, 293, 294, 295, 212, 213, 214, 846, 847, 848, 849, 850, 851, 223, 224

Primary Examiner—Georgia Epps
Assistant Examiner—Dawn-Marie Bey
Attorney, Agent, or Firm—Anderson, Kill & Olick, P.C.

[57] ABSTRACT

An array of thin film actuated mirrors for use in an optical projection system is disclosed. The array includes: a substrate including an array of connecting terminals; an array of actuating structures, each of the actuating structures being provided with 4P+1 number of actuating parts and a light reflecting part, and further including a plurality of dividing slots, wherein odd numbered actuating parts deform in response to an electrical signal, and even numbered actuating parts tilt while remaining planar; and an array of pairs of supporting members, each of the supporting members in each pair being, respectively, located below the first and the (4P+1)th actuating parts in each of the actuating structures, thereby cantilevering the corresponding actuating structure in place. In the inventive array, the light reflecting part in each of the actuating structures, which is connected to the (2P+1)th actuating part, tilts at a larger angle, increasing the tilting efficiency of the array. Furthermore, when the electrical signal is applied to each of the actuating structures, the light reflecting part in each of the actuating structures tilts while remaining planar, which, in turn, increases the optical efficiency of the array.

8 Claims, 7 Drawing Sheets

5,861,979

ARRAY OF THIN FILM ACTUATED MIRRORS HAVING AN IMPROVED OPTICAL EFFICIENCY AND AN INCREASED PERFORMANCE

This application is a continuation-in-part of U.S. Ser. No. 08/363,469 filed on Dec. 23, 1994, now U.S. Pat. No. 5,604,623.

FIELD OF THE INVENTION

The present invention relates to an optical projection system; and, more particularly, to an array of M x N thin film actuated mirrors for use in the system having an improved optical efficiency and an increased performance.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M x N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of an array 10 of M x N thin film actuated mirrors 5 for use in an optical projection system, disclosed in a copending commonly owned application, U.S. Ser. No. 08/331,399, entitled "THIN FILM ACTUATED MIRROR ARRAY AND METHOD FOR THE MANUFACTURE THEREOF", comprising: an active matrix 11 including a substrate 12, an array of M x N transistors (not shown) and an array 13 of M x N connecting terminals 14; an array 15 of M x N thin film actuating structures 16, each of the actuating structures 16 having at least a thin film layer 17 of a motion-inducing material, a first electrode 18 and a second electrode 19, the first and the second electrodes 18, 19 being placed on top and bottom of the thin film motion-inducing layer 17, respectively; an array 20 of M x N supporting members 21, each of the supporting members 21 being used for cantilevering the corresponding actuating structure 16 in place, and also for electrically connecting the actuating structure 16 and the active matrix 11; and an array 22 of M x N mirrors 23 for reflecting light beams, each of the mirrors 23 being placed on top of the actuating structure 16. In the thin film actuated mirror array 10, an electrical signal is applied across the thin film layer 17 of the motion-inducing material located between the pair of electrodes 18, 19 in each of the actuating structures 16, causing a deformation thereof, which will in turn deform the mirror 23 placed on top thereof, thereby changing the optical path of the incident light beam.

One of the major problems associated with the above described array 10 of M x N thin film actuated mirrors 5 is the overall optical efficiency of the array 10. When each of the actuating structures 16 deforms in response to the electric signal applied across the thin film motion-inducing layer 17 thereof, each of the mirrors 23 attached thereto also deforms. However, in the array 10, the portion of the mirror 23 secured to the supporting member 21 does not deform in response to the electric signal, but remains securely in place, and furthermore, the portion of the mirror 23 that deforms bends to thereby create a curved top surface for reflecting the light beams. As a result, the overall optical efficiency of the array 10 decreases, as well as, by the effective length of the mirror 23 being reduced by the length of the portion of the actuating structure 16 secured to the supporting member 21, but also by the curved top surface of the mirror 23 when it bends.

SUMMARY OF THE INVENTION

It is, therefore, a primary object of the present invention to provide an array of M x N actuated mirrors having an improved optical efficiency and an increased performance.

In accordance with one aspect of the present invention, there is provided an array of thin film actuated mirrors for use in an optical projection system, the array comprising: a substrate including an array of connecting terminals; an array of actuating structures, each of the actuating structures being provided with 4P+1 number of actuating parts and a light reflecting part which is connected to the (2N+1)th actuating part in each of the actuating structures, each of the actuating structures further including a plurality of dividing slots, each of the dividing slots defining the actuating and the light reflecting parts in each of the actuating structures, wherein each of the odd actuating parts has a second thin film electrode, a thin film electrodisplacive member, a first thin film electrode, an elastic member and a mirror, and each of the even actuating parts has the second thin film electrode, the thin film electrodisplacive member, the elastic member and the mirror; and an array of pairs of supporting members, each of the supporting members in each pair being, respectively, located below the first and the (4P+1)th actuating parts in each of the actuating structures, and being placed on top of the substrate, thereby cantilevering the corresponding actuating structure in place.

BRIEF DESCRIPTION OF THE DRAWINGS

The above and other objects and features of the present invention will become apparent from the following description of preferred embodiments given in conjunction with the accompany drawings, wherein.

DETAILED DESCRIPTION OF THE PREFERRED EMBODIMENTS

Figure 1:
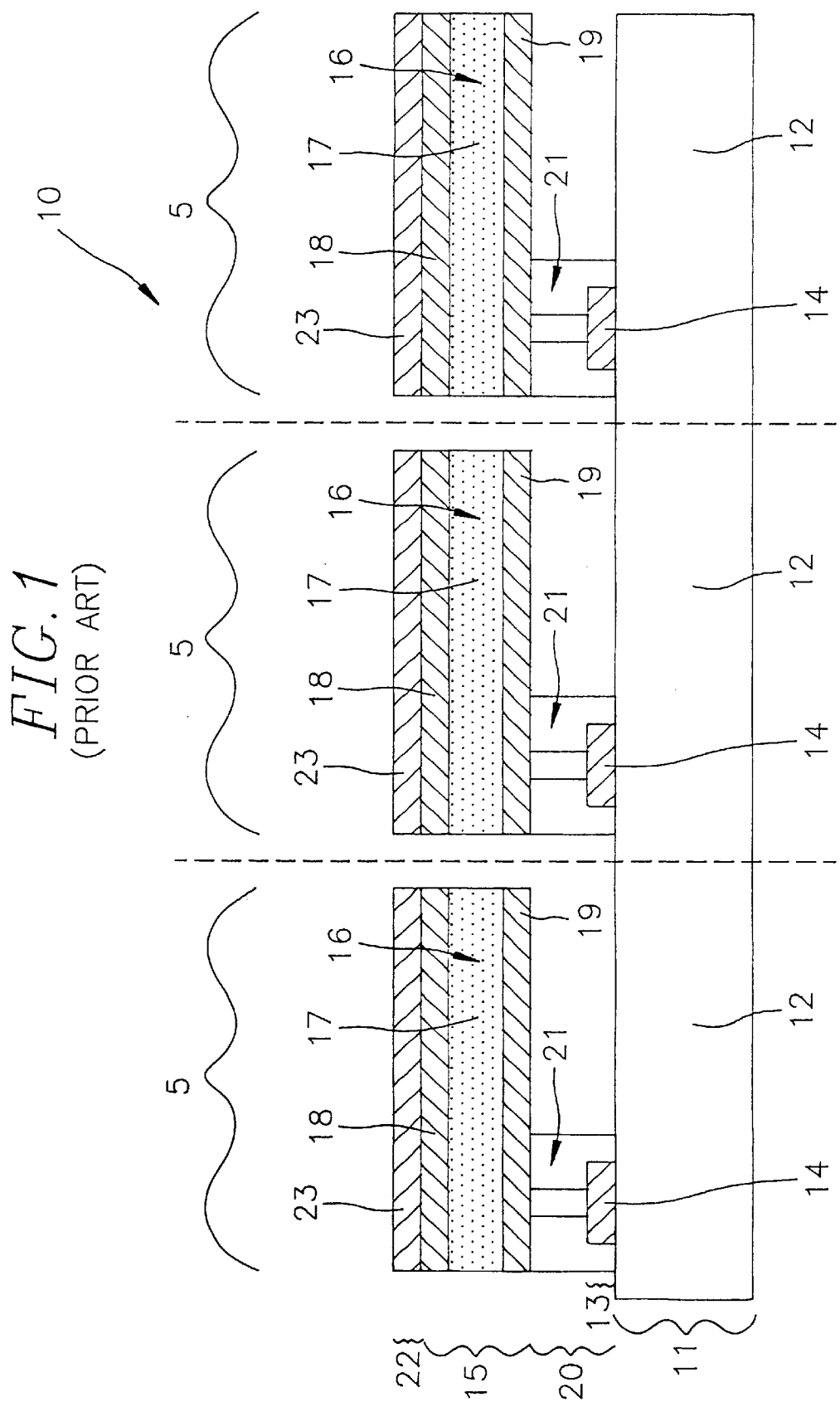
FIG. 1 shows a cross sectional view of an array of thin film actuated mirrors for use in an optical projection system previously disclosed.

Referring now to FIGS. 2 to 5, there are provided a perspective view of an array of M x N thin film actuated mirrors 200 for use in an optical projection system, wherein M and N are integers, in accordance with the present invention, a top view and detailed cross sectional views of a thin film actuated mirror 200 constituting the array, and a schematic view setting forth the operation of the thin film actuated mirror 200 constituting the array, respectively. It should be noted that like parts appearing in FIGS. 2 to 5 are represented by like reference numerals.

Figure 2:
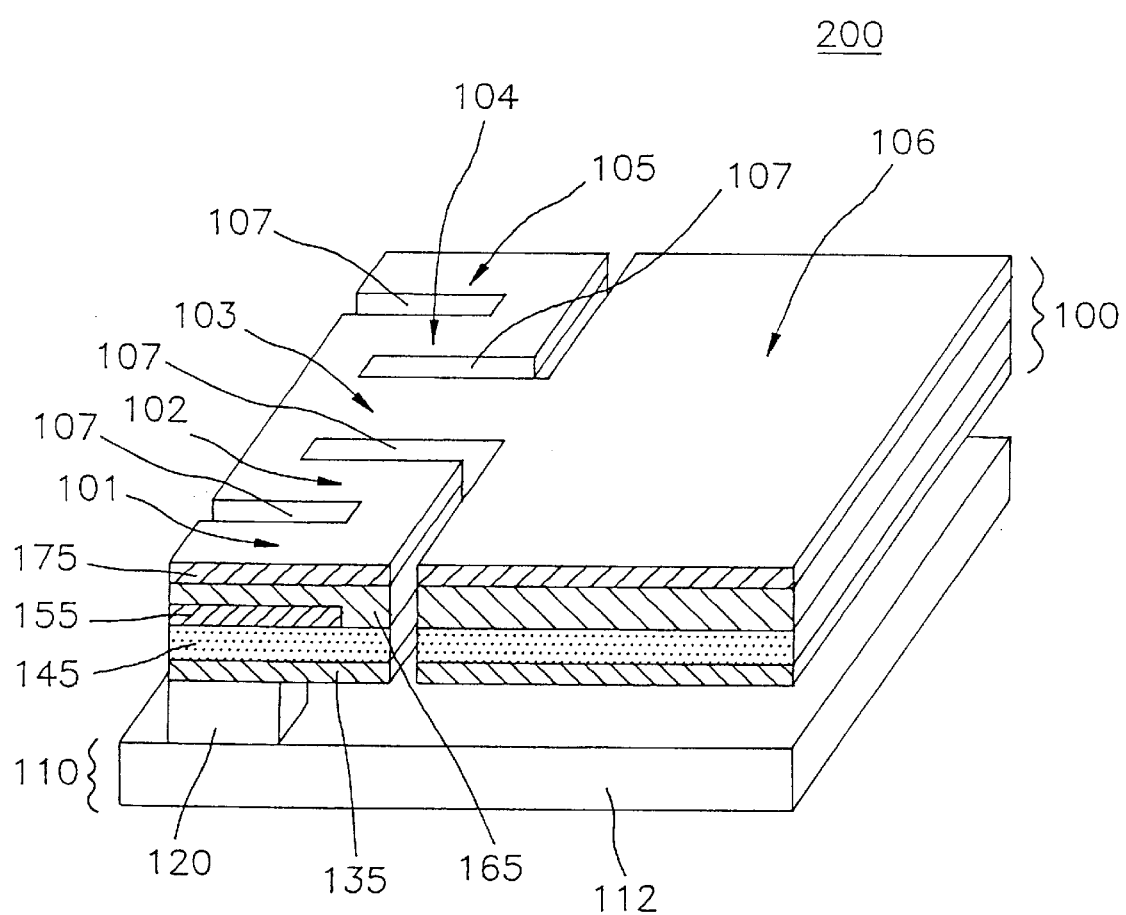
FIG. 2 presents a perspective view of an array of thin film actuated mirrors for use in an optical projection system in accordance with the present invention.

In FIG. 2, there is presented a perspective view of an array of M x N thin film actuated mirrors 200 for use in an optical projection system in accordance with the present invention, the array including an active matrix 110, an array of M x N pairs of supporting members 120 and an array of M x N actuating structures 100.

The active matrix has a substrate 112, an array of M x N transistors (not shown) and an array of M x N connecting terminals 114, wherein each of the connecting terminals 114 is electrically connected to a corresponding transistor in the array of transistors.

Figure 3:
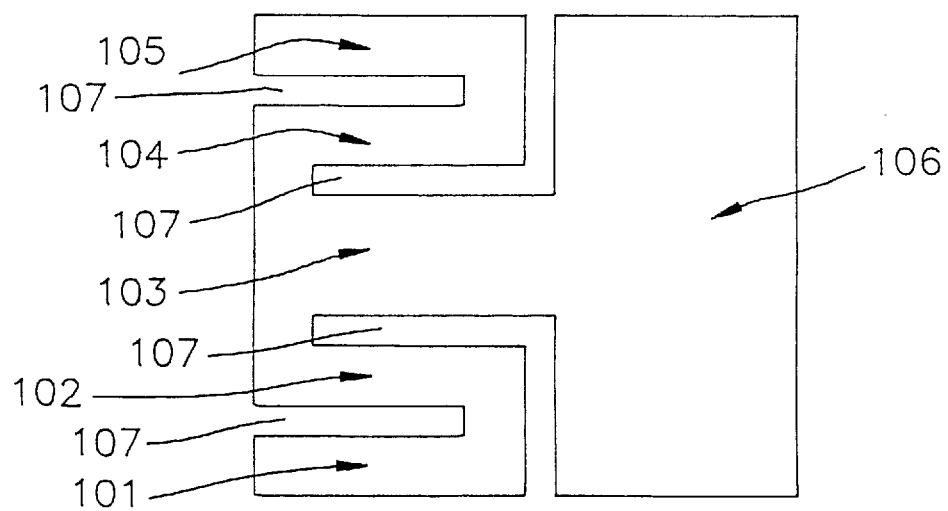
FIG. 3 depicts a top view of a thin film actuated mirror constituting the array shown in FIG. 2.

Each of the actuating structures 100 is provided with a first, a second, a third, a fourth and a fifth actuating parts 101, 102, 103, 104, 105 and a light reflecting part 106, and further includes a plurality of dividing slots 107, wherein each of the actuating parts 101, 102, 103, 104, 105 has a proximal and a distal ends. Each of the dividing slots 107 defines the actuating parts 101, 102, 103, 104, 105 and the light reflecting part 106 in each of the actuating structures 100, as shown in FIG. 3.

Figure 4A:
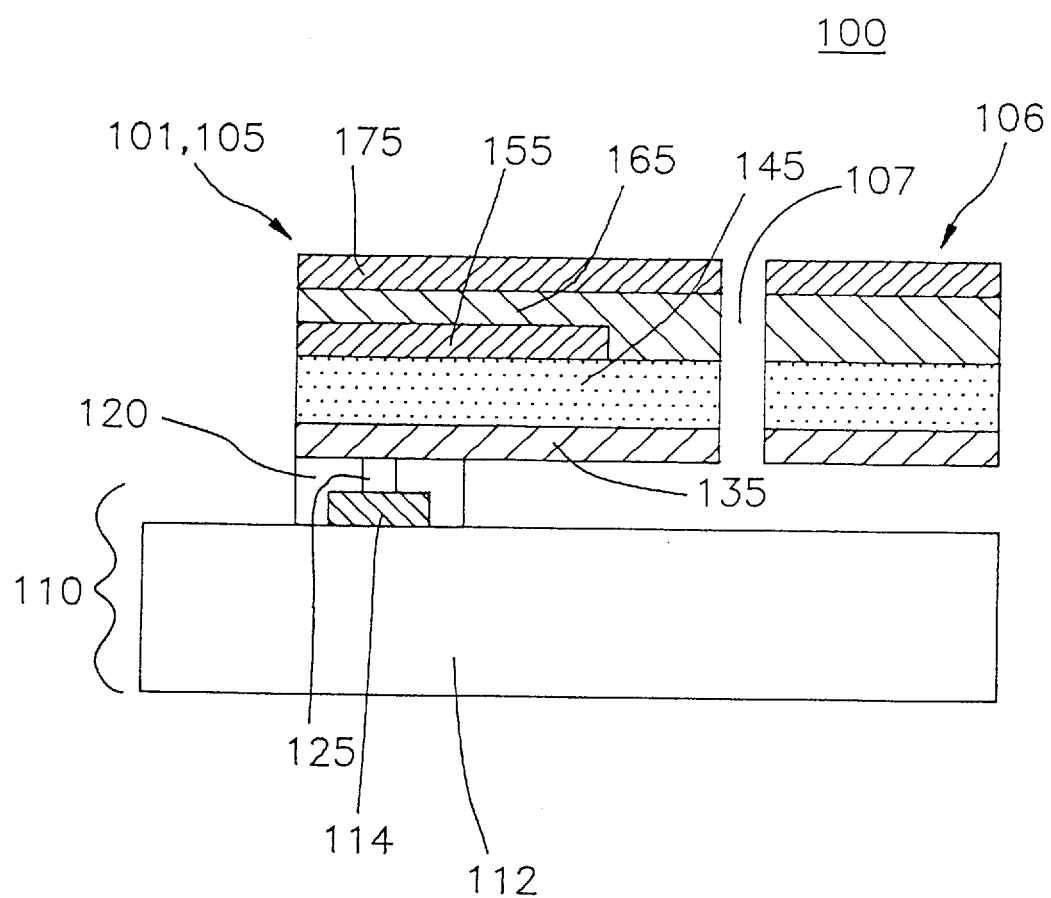
FIGS. 4A to 4C illustrate detailed cross sectional views of a thin film actuated mirror constituting the array shown in FIG. 2.
Figure 4B:
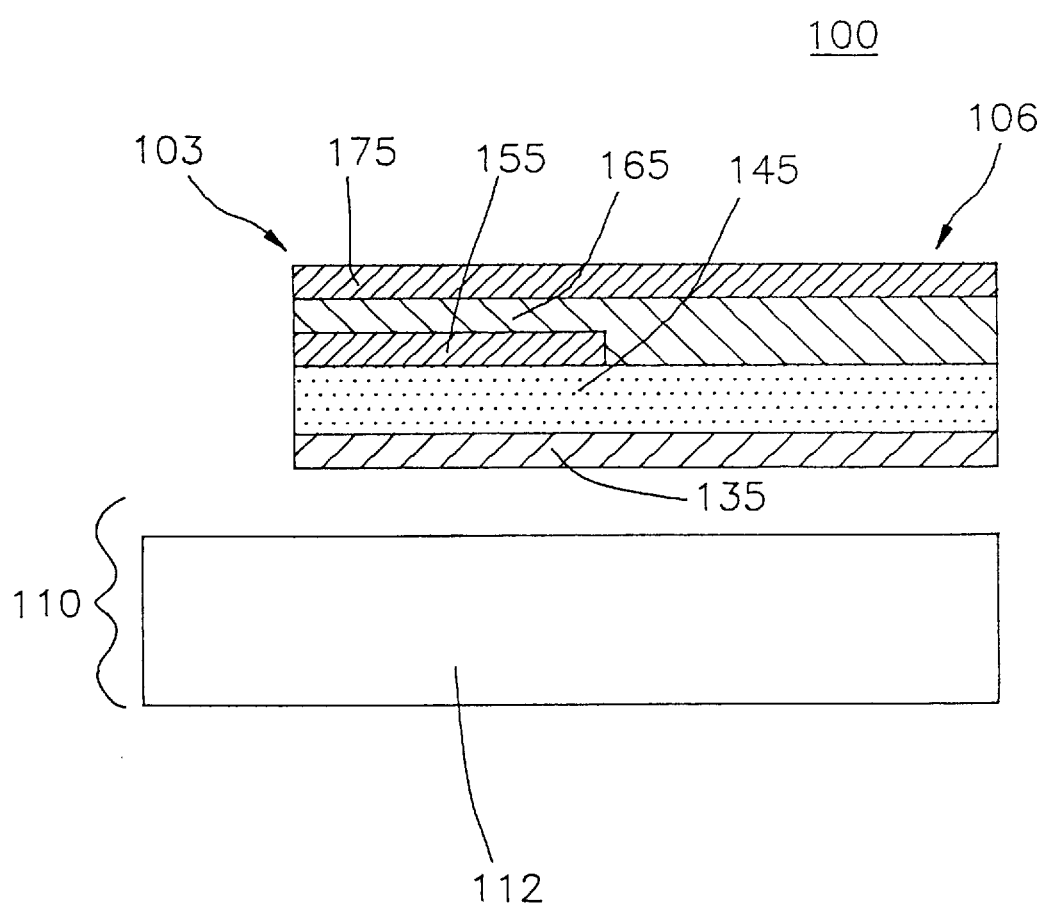

The first, the third and the fifth actuating parts 101, 103, 105 in each of the actuating structures 100 has a second thin film electrode 135 made of an electrically conducting material, a thin film electrodisplacive member 145 made of a piezoelectric or an electrostrictive material, a first thin film electrode 155 made of an electrically conducting material, an elastic member 165 and a mirror 175 made of a light reflecting material, as shown in FIGS. 4A and 4B. The second thin film electrode 135 is located below the thin film electrodisplacive member 145. The elastic member 165 is positioned on top of the thin film electrodisplacive member 145, with the first thin film electrode 155 partially intervening at the proximal ends of the first, the third and the fifth actuating parts 101, 103, 105. The mirror 175 is formed on top of the elastic member 165.

Figure 4C:
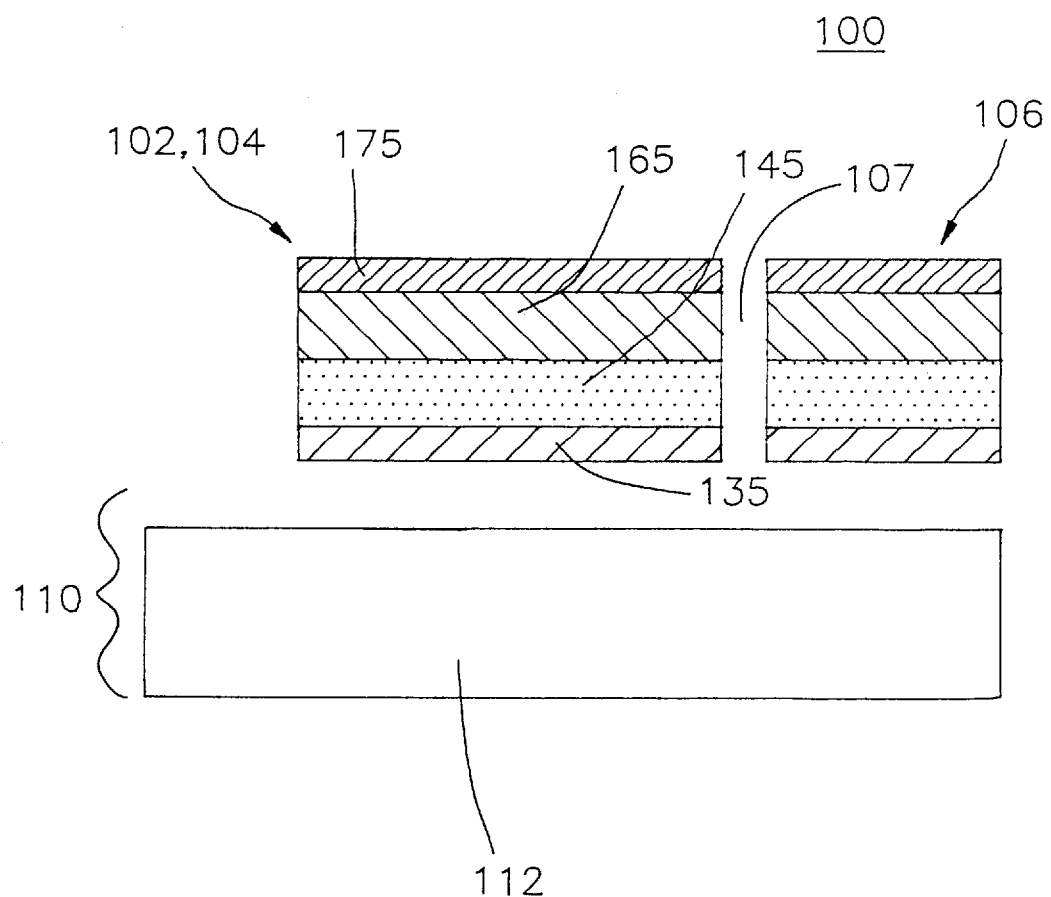

The second and the fourth actuating parts 102, 104 and the light reflecting part 106 in each of the actuating structures 100 has the second thin film electrode 135, the thin film electrodisplacive member 145, the elastic member 165 and the mirror 175, as shown in FIG. 4C. The elastic member 165 and the second thin film electrode 135 are located on top and bottom of the thin film electrodisplacive member 145, respectively. The mirror 175 is positioned on top of the elastic member 165.

In each of the actuating structures 100, the distal ends of the first and the fifth actuating parts 101, 105 are respectively connected to the distal ends of the second and the fourth actuating parts 102. The proximal ends of the second and the fourth actuating parts 102, 104 are connected to the proximal end of the third actuating part 103. The distal end of the third actuating part 103 is connected to the light reflecting part 106.

The first thin film electrode 155 in the first, the third and the fifth actuating parts 101, 103, 105 in each of the actuating structures 100 is electrically connected to ground, thereby functioning as a common bias electrode in the actuating structures 100. The second thin film electrode 135 in the actuating parts 101, 102, 103, 104, 105 in each of the actuating structures 100 is electrically connected to the corresponding connecting terminal 114, thereby functioning as a signal electrode in each of the actuating structures 100.

The supporting members 120 in each pair are located below the proximal ends of the first and the fifth actuating parts 101, 105 in each of the actuating structures 100, respectively, and is attached on top of the active matrix 110, thereby cantilevering the corresponding actuating structure 100 in place. One of the supporting members 120 in each pair thereof includes a conduit 125 made of a metal, thereby electrically connecting the second thin film electrode 135 to the corresponding connecting terminal 114 through the conduit 125.

Figure 5:
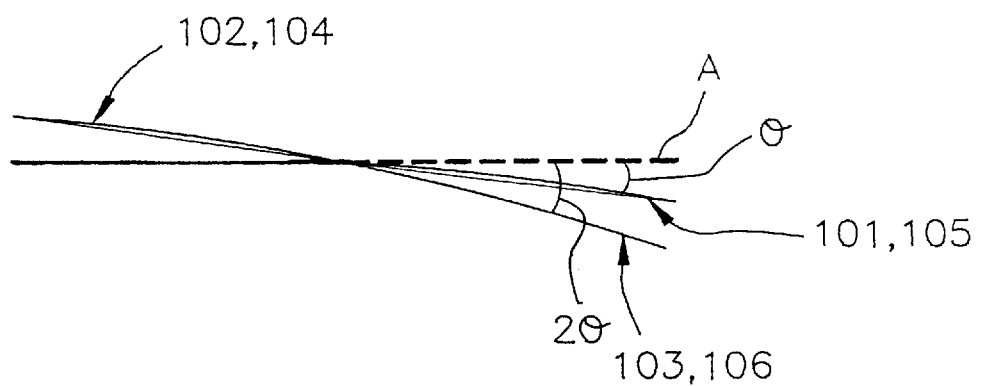
FIG. 5 represents a schematic view setting forth the operation of a thin film actuated mirror constituting the array shown in FIG. 2.

In the array of M x N thin film actuated mirrors 200, when the first and the fifth actuating parts 101, 105 in each of the actuating structures 100, which is provided with the first thin film electrode 155, deform in response to an electrical signal applied thereto, the second and the fourth actuating parts 102, 104 in each of the actuating structures 100 tilt by an angle of, e.g., θ, with respect to a plane A on which a top surface of the mirror 175 initially lies, while remaining planar, and the third actuating part 103 in each of the actuating structures 100, which is also provided with the first thin film electrode 155, also deforms in response to the electrical signal applied thereto, forcing the light reflecting part 106 which is connected to the third actuating part 103 in each of the actuating structures 100 to tilt by approximately 2θ with respect to the plane A on which the top surface of the mirrors 175 initially lies, while remaining planar, as shown in FIG. 5.

In the inventive array of thin film actuated mirrors 200 for use in an optical projection system, since the third actuating part 103 in each of the actuating structures 100 is connected to the first and the fifth actuating parts 101, 105 therein through the second and the fourth actuating parts 102, 104 therein, when the first and the fifth actuating parts 101, 105 deform, causing the second and the fourth actuating parts 102, 104 to tilt at an angle θ, while remaining planar, the light reflecting part 106 in each of the actuating structures 100, which is connected to the third actuating part 103, tilts at a larger angle than θ, increasing the tilting efficiency of the actuating structures 100 in the array.

Furthermore, when the electrical signal is applied to each of the actuating structures 100, the light reflecting part 106 in each of the actuating structures 100 tilts while remaining planar, which, in turn, increases the optical efficiency of the array.

It should be mentioned that, even though, the thin film actuated mirrors 200 are described with respect to the case in which each of the actuating structures 100 in the thin film actuated mirrors 200 has five actuating parts 101, 102, 103, 104, 105, the ideas presented above can be equally well applied to a case, wherein each of the actuating structures 200 has 4P+1 number of actuating parts, the P being integer.

While the present invention has been described with respect to certain preferred embodiments only, other modifications and variations may be made without departing from the scope of the present invention as set forth in the following claims.

What is claimed is:

1. An array of thin film actuated mirrors for use in an optical projection system, the array comprising:
   a substrate including an array of connecting terminals;
   an array of actuating structures, each of the actuating structures being provided with 4P+1 number of actuating parts and a light reflecting part which is connected to the 2P+1th actuating part in each of the actuating structures, each of the actuating structures further including a plurality of dividing slots, each of the dividing slots defining the actuating and the light reflecting parts in each of the actuating structures, wherein the P is equal to one, odd numbered actuating parts being provided with a second thin film electrode, a thin film electrodisplacive member, a first thin film electrode, an elastic member and a mirror, and even numbered actuating parts including the second thin film electrode, the thin film electrodisplacive member, the elastic member and the mirror; and an array of pairs of supporting members, each of the supporting members in each pair being, respectively, located below the first and the 4P+1th actuating parts in each of the actuating structures, and being placed on top of the substrate, thereby cantilevering the corresponding actuating structure in place.

2. The array of claim 1, wherein one of the supporting members in each pair has a conduit for electrically connecting the second thin film electrode to the connecting terminal.

3. The array of claim 1, wherein the second thin film electrode in the actuating parts in each of the actuating structures is located below the thin film electrodisplacive member.

4. The array of claim 3, wherein the elastic member is an insulating material.

5. The array of claim 4, wherein the elastic member in the odd numbered actuating parts in each of the actuating structures is located on top of the thin film electrodisplacive member with the first thin film electrode partially intervening therebetween.

6. The array of claim 5, wherein the elastic member in the even numbered actuating parts in each of the actuating structures is located on top of the thin film electrodisplacive member.

7. The array of claim 6, wherein the mirror in the actuating parts in each of the actuating structures is located on top of the elastic member.

8. The array of claim 1, wherein the actuating parts are interconnected in such a way that a proximal end of the (2P+1)th actuating part is connected to that of the neighboring even numbered actuating parts, distal ends of the even numbered actuating parts being connected to that of the neighboring odd numbered actuating parts, and proximal ends of the odd numbered actuating parts being connected to that of the neighboring even numbered actuating parts.

* * * * *